(12) United States Patent
Matsuda

(10) Patent No.: US 8,554,429 B2
(45) Date of Patent: Oct. 8, 2013

(54) CONTROL SYSTEM IN A VEHICLE

(75) Inventor: Yoshimoto Matsuda, Kobe (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 160 days.

(21) Appl. No.: 13/186,367

(22) Filed: Jul. 19, 2011

(65) Prior Publication Data
US 2012/0022751 A1 Jan. 26, 2012

(30) Foreign Application Priority Data
Jul. 20, 2010 (JP) .................. 2010-162868

(51) Int. Cl.
*F16H 59/74* (2006.01)
(52) U.S. Cl.
USPC .............. 701/54; 701/51; 701/53; 701/102
(58) Field of Classification Search
USPC ........................................................ 701/54
See application file for complete search history.

(56) References Cited

U.S. PATENT DOCUMENTS

| | | | |
|---|---|---|---|
| 7,315,774 B2 * | 1/2008 | Morris ............................ | 701/53 |
| 7,386,381 B2 * | 6/2008 | Matsushima et al. ........... | 701/51 |
| 7,577,507 B2 * | 8/2009 | Morris ............................ | 701/51 |
| 8,046,142 B2 * | 10/2011 | Morris et al. .................... | 701/51 |
| 8,359,144 B2 * | 1/2013 | Morris et al. ................... | 701/51 |
| 2008/0182716 A1 * | 7/2008 | Sato et al. ..................... | 477/110 |
| 2011/0130932 A1 * | 6/2011 | Takenaka et al. ............... | 701/58 |

FOREIGN PATENT DOCUMENTS

| | | |
|---|---|---|
| JP | 2005-321088 A | 11/2005 |
| JP | 2006-329118 A | 12/2006 |
| JP | 2009-108886 A | 5/2009 |
| JP | 2011-111133 A | 6/2011 |

OTHER PUBLICATIONS

Matsuda, Yoshimoto, U.S. Appl. No. 13/186,349, filed Jul. 19, 2011, 36 pages.

* cited by examiner

*Primary Examiner* — Mary Cheung
*Assistant Examiner* — Michael Berns
(74) *Attorney, Agent, or Firm* — Alleman Hall McCoy Russell & Tuttle LLP

(57) ABSTRACT

A control system in a vehicle in which at least one pair of driving power transmission members are engaged with each other with a slack on a driving power transmission path, comprises an input shaft rotational speed detector for detecting a rotational speed of an input shaft located upstream of engaged portions of the driving power transmission members in a direction in which the driving power is transmitted, a determiner for determining whether or not the driving power transmission members are in a non-contact state at the engaged portions for a period of time based on a change rate of the detected input shaft rotational speed, and a controller for controlling the vehicle to reduce a rotational speed difference between the input shaft and an output shaft located downstream of the engaged portions, when the determiner determines that the driving power transmission members are in the non-contact state.

7 Claims, 11 Drawing Sheets

CONTROL SYSTEM IN A VEHICLE

CROSS-REFERENCE TO RELATED APPLICATION

The disclosures of Japanese Patent Application Nos. 2007-279287, 2009-272210, and 2010-162868, including specifications, drawings and claims, are incorporated herein by reference in their entirety.

BACKGROUND ART

1. Field of the Invention

The present invention generally relates to a control system in a vehicle. Particularly, the present invention relates to control for a vehicle including at least a pair of driving power transmission members engaged with each other with a slack on a driving power transmission path through which a driving power is transmitted from a driving power source to a drive wheel.

2. Description of the Related Art

A vehicle such as a motorcycle includes various driving power transmission members such as gears, a dog clutch, a chain, sprockets, and splines on a driving power transmission path from an engine (driving power source) to a drive wheel. These driving power transmission members are arranged such that adjacent driving power transmission members are engaged with each other with a slack on the driving power transmission path. Because of this, when a rotational speed difference is generated between the driving power transmission member located at an upstream side of the engaged portions and the driving power transmission member located at a downstream side of the engaged portions on the driving power transmission path, due to an increase or decrease in an engine speed, an engine braking operation, or the like, these driving power transmission members are disengaged (move away) from each other for a moment (temporarily) and contact each other again thereafter.

For example, during accelerated driving of the vehicle, an increasing engine driving power is transmitted in a state where a surface of the driving transmission member located at the upstream side, which surface is located at one side in a rotational direction, contacts and presses a surface of the driving transmission member located at the downstream side, which surface is located at an opposite side in the rotational direction. Under this condition, if the vehicle shifts to a deceleration state, the upstream driving power transmission member is displaced relative to the downstream driving power transmission member toward the opposite side in the rotational direction and away from each other for a moment and then a surface of the upstream driving transmission member, which surface is located at the opposite side in the rotational direction, re-contacts a surface of the downstream driving transmission member, which surface is located at one side in the rotational direction. At this time, if the relative speed difference between the driving power transmission members is great, they collide against each other and an impact is generated and transmitted to the driver, which makes the driver's driving feeling worse.

To solve this, a technique has been proposed, in which an input shaft located at an upstream side on the driving power transmission path and/or an output shaft located at a downstream side on the driving power transmission path are accelerated or decelerated based on a relative rotational position and/or a relative rotational speed (rotational speed difference) of the input shaft and the output shaft (e.g., see Japanese Laid-Open Patent Application Publication No. 2005-321088). According to this technique, the impact generated by the re-contact between the driving power transmission members at engaged portions engaged with each other with a slack can be mitigated in such a manner that the relative speed difference between the driving power transmission members is lessened before they re-contact each other after they move away from each other.

In the above prior art example, it is necessary to detect the rotational speed of the input shaft located at the upstream side of the engaged portions and the rotational speed of the output shaft located at the downstream side of the engaged portions. For example, Japanese Laid-Open Patent Application Publication No. 2005-321088 discloses that an input shaft sensor 401 is attached on a main shaft 204 which is an input shaft of a transmission 203 and an output shaft sensor 402 is attached on a drive shaft 211 which is an output shaft of the transmission 203.

However, in a case where a sensor is attached on an output shaft of a transmission in, for example, a motorcycle, it is necessary to prevent an adverse effect which would be caused by clattering of a drive chain installed around a sprocket present in the vicinity of the sensor. To avoid misdetection which would be caused by the clattering or vibration of the chain, it is necessary to support the sensor in a floating state by a damper, or to cover the sensor with a stiff metal-made cover member in order to avoid contact with the clattering or vibrating chain, which would increase a cost.

SUMMARY OF THE INVENTION

The present invention addresses the above described condition, and an object of the present invention is to determine whether or not an impact is likely to be generated by driving power transmission members engaged with each other with a slack on a driving power transmission path and to control a vehicle to suppress the impact, without increasing a cost, thereby improving driving feeling.

According to the present invention, a control system in a vehicle including at least one pair of driving power transmission members which are engaged with each other with a slack on a driving power transmission path through which a driving power is transmitted from a driving power source to a drive wheel, comprises an input shaft rotational speed detector for detecting a rotational speed of an input shaft located upstream of engaged portions of the driving power transmission members in a direction in which the driving power is transmitted, the engaged portions being engaged with each other with the slack; a determiner for determining whether or not the driving power transmission members are in a non-contact state at the engaged portions for a period of time, based on a change rate of the detected input shaft rotational speed; and a controller for controlling the vehicle to reduce a rotational speed difference between the input shaft and an output shaft located downstream of the engaged portions in the direction in which the driving power is transmitted, when the determiner determines that the driving power transmission members are in the non-contact state.

In accordance with the vehicle including the control system configured as described above, if a rotational speed difference is generated between the driving power transmission member located upstream of the engaged portions engaged with the slack and the driving power transmission member located downstream of the engaged portions on the driving power transmission path, by acceleration, deceleration, or the like, and the engaged portions of these driving power transmission members move to the non-contact state (away from each other) temporarily, the rotational speed of the upstream transmission member changes rapidly due to reduction in a load and inertia in such a way that the rotational speed increases rapidly during the acceleration and decreases rapidly during the deceleration. Therefore, when the change rate of the input shaft rotational speed exceeds a predetermined threshold, it can be determined that the driving power transmission members are in the non-contact state.

When it is determined that the engaged portions of the driving power transmission members are in the non-contact state, the controller increases or decreases at least one of the rotational speed of the input shaft upstream of the engaged portions and the rotational speed of the output shaft downstream of the engaged portions to reduce the rotational speed difference between them. This makes it possible to reduce the relative speed difference when the driving power transmission members re-contact each other at the engaged portions thereafter and thereby mitigate an impact generated by the re-contact.

In other words, the non-contact state of the engaged portions and hence generation of an impact can be predicted or estimated, based on the change rate of the rotational speed of the input shaft upstream of the engaged portions on the driving power transmission path in the vehicle. Therefore, unlike the prior art example, it is not necessary to detect the rotational speed at the downstream side of the engaged portions in the direction in which the driving power is transmitted, and a sensor for this purpose may be omitted. As a result, a cost increase is suppressed. In particular, as compared to the prior art example (Japanese Laid-Open Patent Application Publication No. 2005-321088) in which a sensor is attached on an output shaft of a transmission, it is not necessary to prevent an adverse effect which would be caused by clattering of a chain, which is costly. Thus, a cost advantage is achieved.

In the control system in the vehicle, a threshold used to determine whether or not the driving power transmission members are in the non-contact state may be changed according to a predetermined vehicle state. As described above, the determination as to the non-contact state based on the change rate of the input shaft rotational speed is likely to be affected by, for example, various vehicle states such as a vehicle speed, a throttle valve opening degree, a slip state of a drive wheel, a transmission gear position, an operated state of a clutch, a actuated state of a brake, etc. Therefore, by changing the threshold used for determination, precision in determination can be improved.

Preferably, when the driving power source is a multi-cylinder engine including a plurality of cylinders, the controller may cause ignition in at least one of the cylinders to be paused when the determiner determines that the driving power transmission members are in the non-contact state, and the determiner may determine that the driving power transmission members are in the non-contact state, when an absolute value of the change rate of the input shaft rotational speed is greater than a predetermined threshold.

In this case, preferably, the threshold for the determination is changed such that an absolute value of the threshold is greater when an engine speed is relatively lower than when the engine speed is relatively higher.

In the multi-cylinder engine, the engine torque can be reduced effectively by pausing combustion in at least one cylinder. This allows the input shaft rotational speed to be decreased with high responsiveness. It should be noted that when the engine speed is low, the driver feels uneasy about a driving state of the vehicle if the engine torque is reduced by pausing ignition in the cylinder. In such occasions, the absolute value of the threshold used for the determination is set to a greater value to reduce the number of times ignition in the cylinder is paused.

The determiner may include a first determiner for determining whether or not the driving power transmission members are in a non-contact state, based on the change rate of the input shaft rotational speed; and a second determiner for determining whether or not the driving power transmission members are in the non-contact state, based on a rotational speed difference between the input shaft rotational speed and an output shaft rotational speed as recited in the prior art example. Since the two determiners make determination using different indices, it can be determined more correctly that the driving power transmission members are in the non-contact state.

To be specific, the first determiner determines whether or not the driving power transmission members are in the non-contact state, based on the change rate of the input shaft rotational speed, without being substantially affected by a drive wheel speed, i.e., a driving speed of the vehicle or a road surface condition. For example, when the driver rotates a throttle grip to a position corresponding to a fully open position of a throttle valve, it is possible to determine promptly that the driving power transmission members are in the non-contact state, because of a rapid increase in the input shaft rotational speed. On the other hand, when the driver does not rotate the throttle grip so much, there is a chance that the change rate of the input shaft rotational speed does not increase so greatly. In light of this, the determination performed by the first determiner and the determination performed by the second determiner may be combined.

It should be noted that, if the sensor is attached on the output shaft of the transmission in the motorcycle, a cost will substantially increase because there is a need to prevent an adverse effect which would be caused by clattering of the chain, as described above. Accordingly, a sensor (rotational speed sensor) is preferably attached on a rotational shaft (downstream shaft) located downstream of the output shaft in the direction in which the driving power is transmitted, to detect a rotational speed of the downstream shaft. The sensor may be configured to detect a rotational speed of an axle of the drive wheel which is the downstream shaft. This allows the sensor to be also used for an antilock braking system.

However, in the case of the motorcycle, a drive chain, a belt and other members are typically provided upstream of a rear wheel which is the drive wheel, and therefore a slack of the chain or the like must be taken into account. Because of the slack of the chain or the like, a speed difference between the rotational speed of the drive wheel downstream of the chain or the like and the rotational speed of the output shaft of the transmission upstream of the chain or the like tends to be generated. Therefore, if it is determined whether or not the driving power transmission members are in the non-contact state, based on the rotational speed difference between the input shaft rotational speed and the drive wheel rotational speed, misdetermination might occur.

In light of this, the degree to which the rotational speed of the input shaft or the output shaft is increased or decreased may be reduced, when the second determiner determines that the driving power transmission members are in the non-contact state, than when the first determiner determines that the driving power transmission members are in the non-contact state. In this configuration, even if the second determiner misdetermines that the driving power transmission members are in the non-contact state, the degree to which the rotational speed is increased or decreased is made less in the control performed according to a result of the determination. Therefore, the driver does not feel uneasy about the driving state of the vehicle.

In other words, the degree to which the rotational speed of the input shaft or the output shaft is increased or decreased is increased such that the rotational speed difference between the input shaft and the output shaft is made less, when the first determiner determines that the driving power transmission members are in the non-contact state, than when the second determiner determines that the driving power transmission members are in the non-contact state. Thus, an impact can be mitigated effectively when the first determiner makes determination.

For example, when the driving power source in the vehicle is a multi-cylinder engine including a plurality of cylinders, the controller may cause ignition in at least one of the cylinders to be paused when the first determiner determines that the driving power transmission members are in a non-contact state; and the controller may cause an ignition timing in at least one of the cylinders to be retarded when the second determiner determines that the driving power transmission members are in the non-contact state. Thus, by pausing ignition in the cylinder or retarding ignition timing, the engine torque can be controlled with high responsiveness, and engine speed and hence the rotational speed of the input shaft on the driving power transmission path can be decreased.

The above and further objects, features and advantages of the invention will more fully be apparent from the following detailed description with reference to the accompanying drawings.

DETAILED DESCRIPTION OF THE PREFERRED EMBODIMENTS

Figure 1:
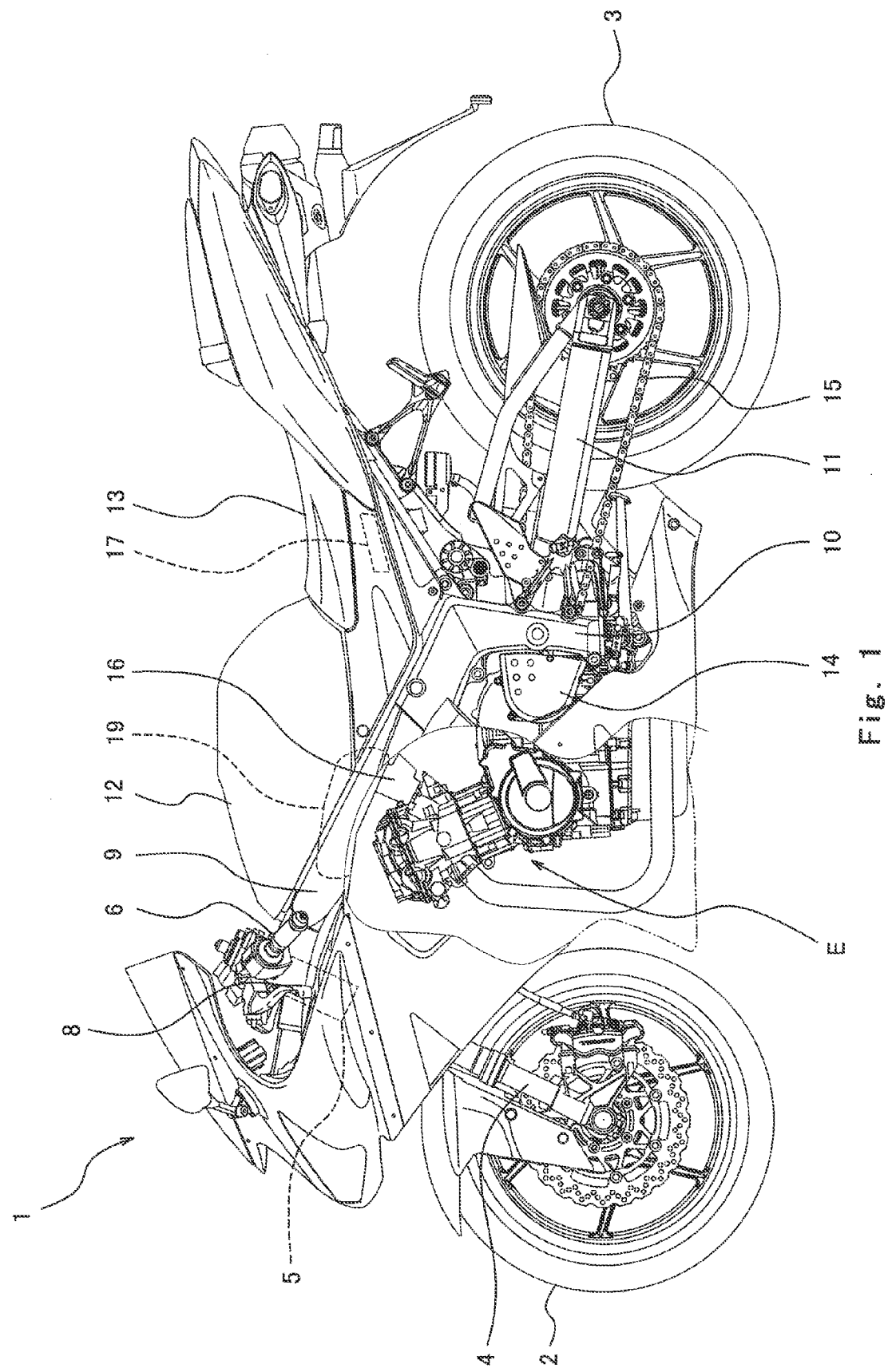
FIG. 1 is a left side view of a motorcycle according to Embodiment 1 of the present invention.

Hereinafter, embodiments of the present invention will be described with reference to the drawings. Throughout the drawings, the same or corresponding constituents are designated by the same reference characters, and will not be described repetitively. The stated directions are referenced from the perspective of a driver straddling a motorcycle, unless otherwise explicitly noted.

(Embodiment 1)

FIG. 1 is a left side view of a motorcycle 1 (vehicle) according to Embodiment 1 of the present invention. Referring to FIG. 1, the motorcycle 1 includes a front wheel 2 which is a driven wheel and a rear wheel 3 which is a drive wheel. The front wheel 2 is rotatably mounted to the lower end portion of a front fork 4 extending substantially vertically. The front fork 4 is attached to a steering shaft (not shown) via brackets (not shown). The steering shaft is rotatably supported by a head pipe 5 provided at a vehicle body.

A bar-type steering handle 6 extending in a rightward and leftward direction is attached to the brackets. By maneuvering the steering handle 6, the driver steers the front fork 4 and the front wheel 2. A throttle grip 7 (see FIG. 4) is provided at a right end portion of the steering handle 6 which is gripped by the driver's right hand. The throttle grip 7 is rotated by twisting the driver's wrist to operate a throttle device 16 as described later. A clutch lever 8 is provided in front of a grip provided at a left end portion of the steering handle 6 gripped by the driver's left hand.

A pair of right and left main frame members 9 extend rearward to be slightly tilted in a downward direction from the head pipe 5. A pair of right and left pivot frame members 10 are coupled to the rear portions of the main frame members 9, respectively. The front end portions of swing arms 11 extending substantially in the longitudinal direction of the motorcycle 1 are coupled to the pivot frame members 10, respectively such that each swing arm 11 is pivotable around the front end portion. The rear wheel 3 is rotatably mounted to the rear end portion of the swing arm 11. A fuel tank 12 is provided behind the steering handle 6. A seat 13 straddled by the driver is provided behind the fuel tank 12.

An engine E (driving power source) including a plurality of cylinders is mounted to the main frame members 9 and to the pivot frame members 10, between the front wheel 2 and the rear wheel 3. A transmission 14 is coupled to the engine E. A driving power output from the engine E is speed-changed by the transmission 14 and transmitted to the rear wheel 3 via a chain 15. The throttle device 16 is coupled to intake ports (not shown) of the engine E. An air cleaner 19 is disposed below the fuel tank 12 and coupled to the upstream portion of the throttle device 16 in an air flow direction. In an inner space below the seat 13, an ECU 17 (electronic control unit) configured to control the throttle device 16, an ignition device 48 (see FIG. 4), an injector 47 (see FIG. 4), etc., are accommodated.

Figure 2:
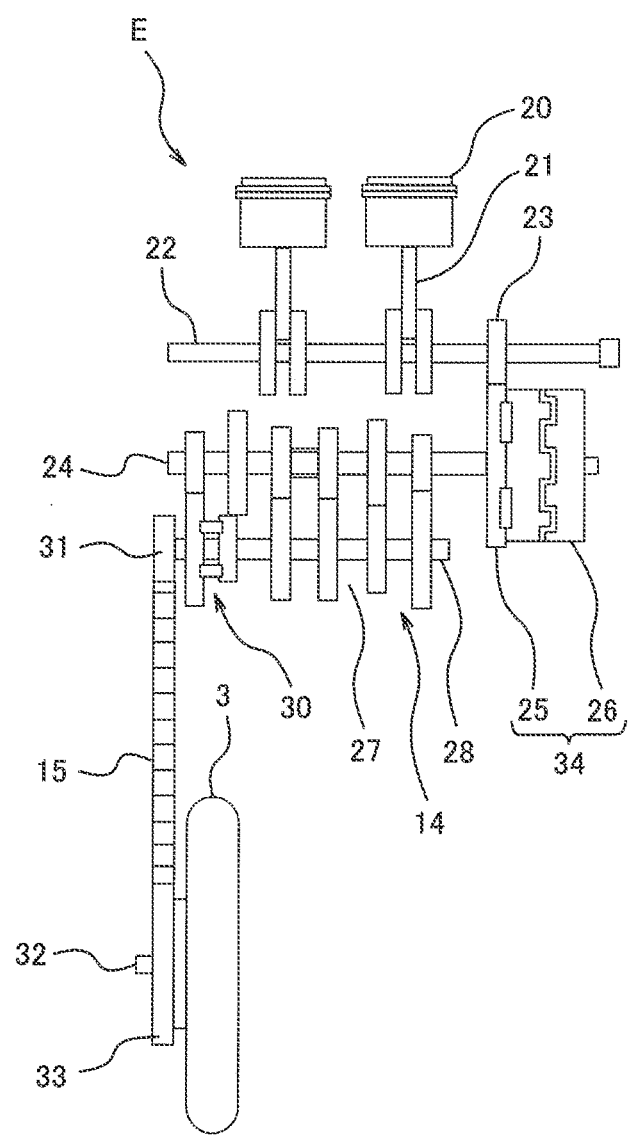
FIG. 2 is a schematic view mainly showing a driving system of the motorcycle of FIG. 1.

FIG. 2 is a schematic view showing a driving system of the motorcycle of FIG. 1. As shown in FIG. 2, the engine E is provided with a crankshaft 22 coupled to pistons 20 thereof via connecting rods 21. A first clutch gear 23 is mounted on the end portion of the crankshaft 22. A second clutch gear 25 is rotatably externally fitted to an input shaft 24 of the transmission 14 and configured to mesh with the first clutch gear 23. A main clutch 26 is mounted on the end portion of the input shaft 24 such that it is opposite to the second clutch gear 25. The main clutch 26 and the second clutch gear 25 constitute a clutch 34 for permitting and inhibiting the transmission of the driving power from the engine E to the transmission 14.

With the main clutch 26 coupled to the second clutch gear 25, the input shaft 24 is rotatable in association with the crankshaft 22. An output shaft 28 is coupled to the input shaft 24 via a gear train 27 and arranged in parallel with the input shaft 24 such that the rotational speed of the input shaft 24 is changed by the gear train 27 and transmitted to the output shaft 28. By changing a combination of gears in mesh in the gear train 27 (i.e., gear change), a ratio between the rotational speed of the input shaft 24 and the rotational speed of the output shaft 28 is changed. The gear change is performed by a known dog clutch 30.

A drive sprocket 31 is mounted on the end portion of the output shaft 28. A driven sprocket 33 is mounted on an axle 32 of the rear wheel 3. A chain 15 is installed around the drive sprocket 31 and the driven sprocket 33. The axle 32 of the rear wheel 3 is mounted to the rear end portion of the swing arm 11. The swing arm 11 is pivoted vertically such that the degree of a slack of the chain 15 is changed. To be specific, the degree of a slack of the chain 15 tends to increase when the swing arm 11 is pivoted such that its rear end is tilted in an upward direction.

Figure 3A:
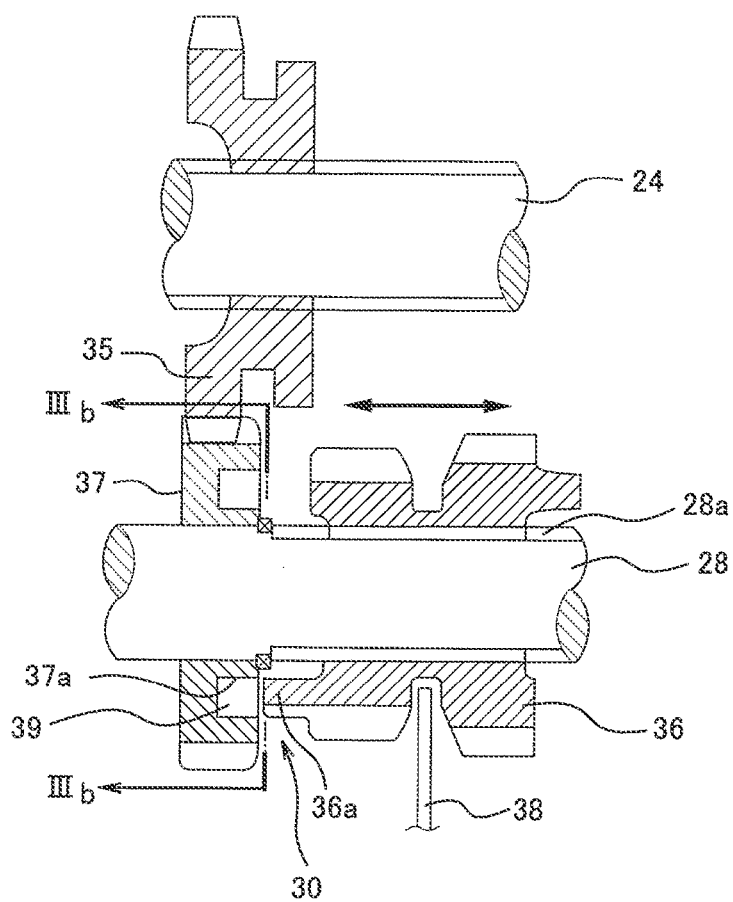
FIG. 3A is a cross-sectional view of a dog clutch in the driving system of FIG. 2.
Figure 3B:
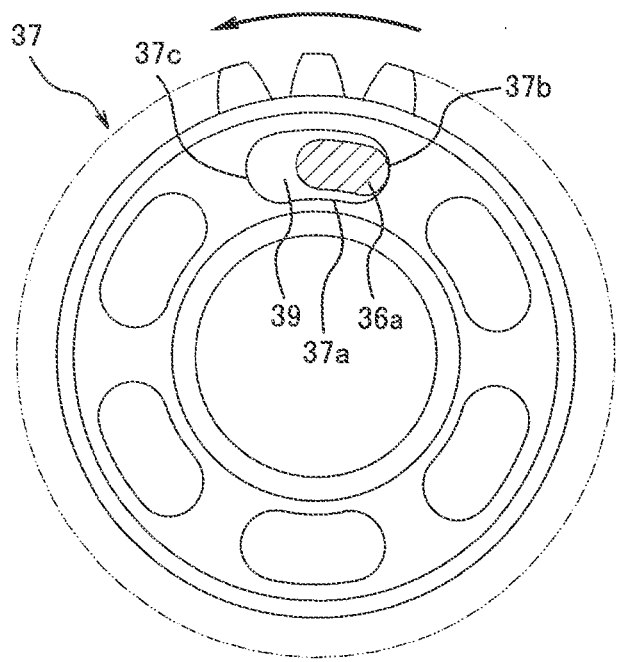
FIG. 3B is a cross-sectional view taken along line IIIb-IIIb of FIG. 3A.

FIG. 3A is a cross-sectional view of the dog clutch 30 in the driving system of FIG. 2 and FIG. 3B is a cross-sectional view taken along line IIIb-IIIb of FIG. 3A. Referring to FIGS. 3A and 3B, the dog clutch 30 includes a pair of gears 36 and 37 (driving power transmission members) which are arranged opposite to each other such that they are movable close to and away from each other in the axial direction of the output shaft 28. The output shaft 28 is provided on its outer peripheral surface with a spline 28a extending in a groove shape in the axial direction. The gear 36 is externally fitted to the output shaft 28 in mesh with the spline 28a. In other words, the gear 36 is slidable in the axial direction of the output shaft 28 and is rotatable integrally with the output shaft 28. The gear 37 is externally fitted to the output shaft 28 such that the gear 37 is rotatable relative to the output shaft 28.

The gear 36 has on its axial end surface an engagement protruding portion 36a protruding in the axial direction toward the gear 37. The gear 37 has an engagement recess portion 37a opposite to the engagement protruding portion 36a. A shift fork 38 allows the gear 36 to slide along the output shaft 28, thereby changing an axial distance between the gears 36 and 37. Thus, the gears 36 and 37 are brought into or out of an engaged state. A portion of the engagement protruding portion 36a and a portion of the engagement recess portion 37a which are engaged with each other are an example of engagement portions of the present invention.

The engagement protruding portion 36a and the engagement recess portion 37a are engaged with each other with a slack such that they are movable closer to and away from each other. To be specific, there is a space 39 in a state where the engagement protruding portion 36a and the engagement recess portion 37a are engaged with each other with a slack, and in this state they are rotatable relative to each other. In a case where a wall surface 37b of the engagement recess portion 37a, which wall surface is located at one side in a rotational direction of the output shaft 28, is in contact with the engagement protruding portion 36a, the gear 37 is rotated by the gear 35 of the input shaft 24, causing the gear 36 to rotate. In this way, a rotational power is transmitted from the gear 37 located at an upstream side on the driving power transmission path to the gear 36 located at a downstream side on the driving power transmission path. Hereinafter, the wall surface 37b of the engagement recess portion 37a which is located at one side in the rotational direction of the output shaft 28 is referred to as an acceleration wall surface 37b, while a wall surface 37c of the engagement recess portion 37a which is located at an opposite side in the rotational direction of the output shaft 28 is referred to as a deceleration wall surface 37c.

Figure 4:
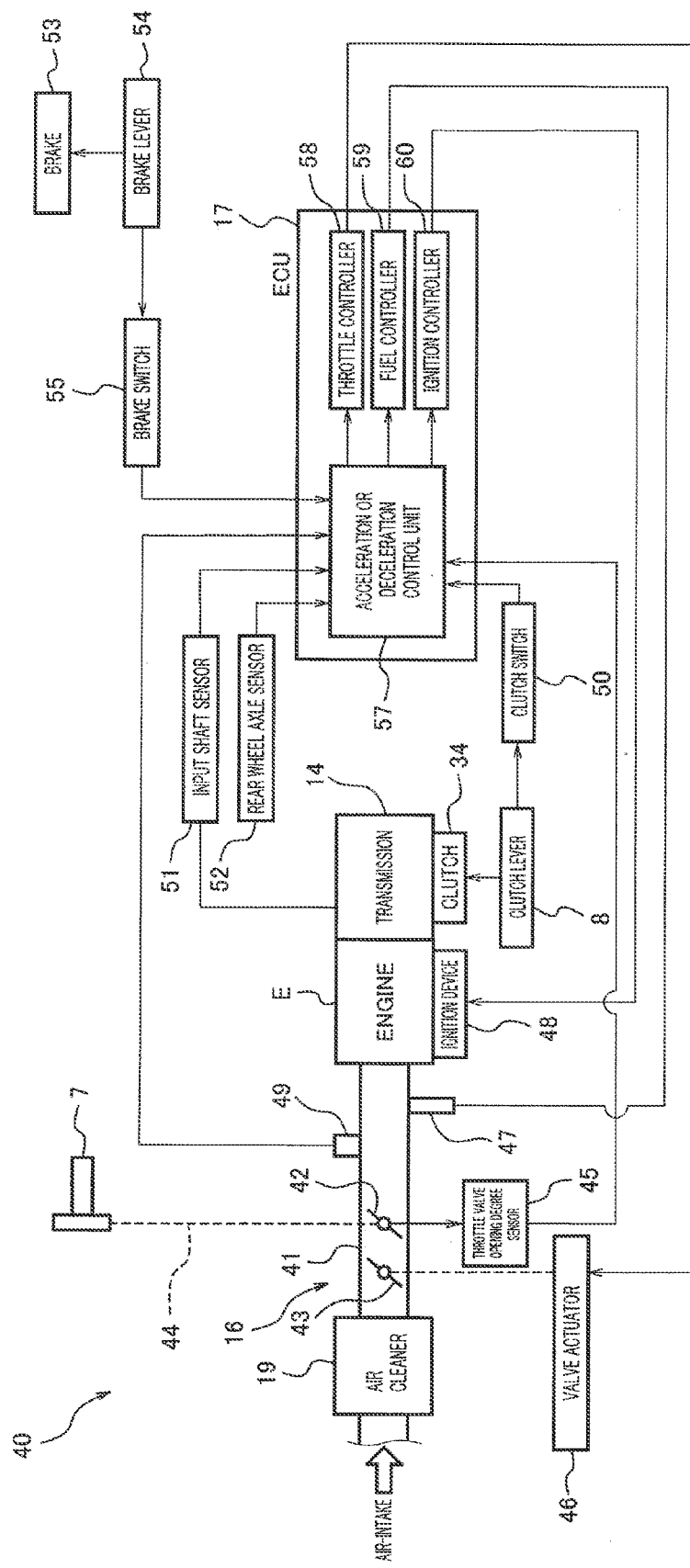
FIG. 4 is a block diagram showing an overall vehicle control system built into the motorcycle of FIG. 1.

FIG. 4 is a block diagram showing an overall vehicle control system 40 built into the motorcycle of FIG. 1. Referring to FIG. 4, the vehicle control system 40 includes the throttle device 16 provided between the air cleaner 19 and the engine E. The throttle device 16 includes an air-intake pipe 41, a main throttle valve 42 positioned at a downstream in the air-intake pipe 41, and a sub-throttle valve 43 positioned at the upstream of the main throttle valve 42 in the air-intake pipe 41. The main throttle valve 42 is coupled to the throttle grip 7 via a throttle wire 44. The main throttle valve 42 is opened and closed by the driver's operation of the throttle grip 7. The main throttle valve 42 is attached with a throttle valve opening degree sensor 45 for detecting an opening degree of the main throttle valve 42. Since the main throttle valve 42 is mechanically operative with the throttle grip 7, the throttle valve opening degree sensor 45 detects the operation amount of the throttle grip 7.

The sub-throttle valve 43 is coupled to a valve actuator 46 including a motor controlled by the ECU 17, and is driven by the valve actuator 46 to be opened and closed. A plurality of injectors 47 are provided in the throttle device 16 to inject a fuel to inside of a plurality of air-intake passages respectively corresponding to the plurality of cylinders in the engine E. The engine E is provided with a plurality of ignition devices 48 for igniting an air-fuel mixture within the plurality of cylinders, respectively. The air-intake pipe 41 is attached with an air-intake pressure sensor 49 for detecting an air-intake pressure of air flowing through the air-intake passage.

A clutch lever 8 (see FIGS. 1 and 3) is coupled to the clutch 34 between the engine E and the transmission 14 via a wire, or the like. When the clutch lever 8 is gripped by the driver, the clutch 34 is disengaged to inhibit the driving power from being transmitted from the engine E to the transmission 14, whereas when the clutch lever 8 is released by the driver, the clutch 34 permits the driving power to be transmitted. The clutch lever 8 is provided with a clutch switch 50 for detecting whether or not the clutch lever 8 has been gripped by the driver.

The transmission 14 is attached with an input shaft sensor 51 for detecting a rotational speed Vi of the input shaft 24, but is not attached with a sensor for detecting a rotational speed Vo of the output shaft 28. The rotational speed of a component or member at the output shaft is detected by a rear wheel axle sensor 52 attached on the axle 32 (see FIG. 2) of the motorcycle 1. No sensor is attached on the output shaft 28 of the transmission 14 to eliminate a need to prevent an adverse effect which would be caused by clattering of the chain 15 installed around the drive sprocket 31, thereby reducing a cost.

In the present embodiment, the operated state of the brake 53 of the motorcycle 1 can be detected, as in the case of the above clutch operation. For example, the driver operates a brake lever 54 or the like to actuate the brake 53 to brake the front wheel 2 and/or the rear wheel 3. The brake lever 54 is attached with a brake switch 55 for detecting whether or not the driver has operated the brake lever 54.

The throttle valve opening degree sensor 45, the clutch switch 50, the input shaft sensor 51, the rear wheel axle sensor 52 and the brake switch 55 are coupled to the ECU 17. The ECU 17 includes an acceleration and deceleration control unit 57, a throttle controller 58, a fuel controller 59, and an ignition controller 60. As described later in detail, the acceleration and deceleration control unit 57 is configured to perform calculations relating to driving power control in the engine E for increasing or decreasing the rotational speed Vi of the input shaft 24, based on signals received from the sensors 45, 51, 52, and the switches 50 and 55. The throttle controller 58 is configured to drive the valve actuator 46 based on data calculated in the acceleration and deceleration control unit 57 and control the opening degree of the sub-throttle valve 43. The fuel controller 59 is configured to control the injector 47 based on data calculated in the acceleration and deceleration control unit 57. The ignition controller 60 is configured to control the ignition devices 48 based on data calculated in the acceleration and deceleration control unit 57.

Figure 5:
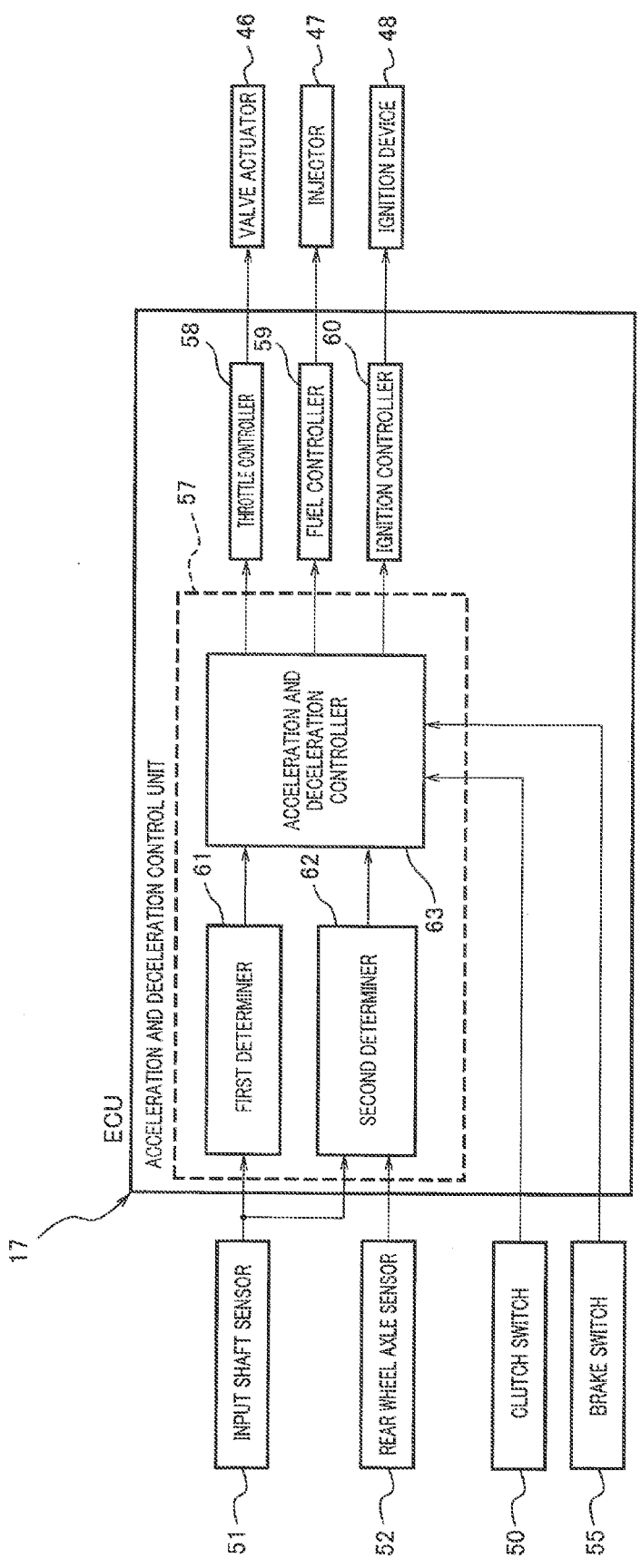
FIG. 5 is a block diagram showing major components in the vehicle control system of FIG. 4.

FIG. 5 is a block diagram showing major components in the vehicle control system 40 of FIG. 4. Referring to FIG. 5, the acceleration and deceleration control unit 57 in the ECU 17 includes first and second determiners 61 and 62 for determining whether or not driving power transmission members of the dog clutch 30 are in a non-contact state, which may cause an impact by re-contact of them, as will be described later, and an acceleration and deceleration controller 63 for increasing or decreasing the rotational speed Vi of the input shaft 24 of the transmission 14 according to a result of the determination performed by at least one of the first and second determiners 61 and 62.

To be specific, in the motorcycle 1, the transmission 14 is provided with the dog clutch 30. As described above, the pair of gears 36 and 37 in the dog clutch 30 are rotatable relative to each other within a slack between the engagement protruding portion 36a and the engagement recess portion 37a. For example, when the motorcycle 1 shifts from decelerated driving to accelerated driving or from the accelerated driving to the decelerated driving, the engagement protruding portion 36a and the engagement recess portion 37a move away from each other for a moment (for a certain period of time) and thereafter re-contact. If a rotational speed difference between the gears 36 and 37 is great, an impact generated by the collision between the gears 36 and 37 is transmitted to the driver, which makes the driver feel discomfort.

To solve this, in the present embodiment, the first and second determiners 61 and 62 determine whether or not the gears 36 and 37 are in the non-contact state (in the dog clutch 30), and the acceleration and deceleration controller 63 controls the engine torque and increases or decreases the rotational speed Vi of the input shaft 24 in the transmission 14, thereby reducing the rotational speed difference between the gears 36 and 37. In this way, the impact generated by the engagement protruding portion 36a and the engagement recess portion 37a is mitigated.

To be more specific, in the present embodiment, the first determiner 61 determines that the engagement protruding portion 36a of the gear 36 and the engagement recess portion 37a of the gear 37 which are in engagement are in the non-contact state (away from each other), when a change rate of the input shaft rotational speed Vi detected by the input shaft sensor 51, i.e., a difference $\Delta Vi$ of the input shaft rotational speed Vi is greater than a predetermined differential (difference) threshold $\Delta Vi_1$. In a state where the engagement protruding portion 36a and the engagement recess portion 37a are in the non-contact state, a load applied in a direction from the rear wheel 3 to the input shaft 24 is made free, and an inertia of the components or members in the driving system which are located upstream of the input shaft 24 decreases rapidly, and the rotational speed of the components or members upstream of the input shaft 24 changes rapidly. From this, it can be determined that the engagement protruding portion 36a of the gear 36 and the engagement recess portion 37a of the gear 37 are in the non-contact state.

In this embodiment, as the difference $\Delta Vi$ of the input shaft rotational speed Vi, the difference between two values adjacent in the time series relation, among values detected by the input shaft sensor 51 at a predetermined sampling period (difference obtained by subtracting a former value from a latter value in a time series relation), is used. Alternatively, the difference $\Delta Vi$ may be a difference between two values which are not adjacent in the time series relation, or may be a difference value obtained by a moving average process.

In contrast, the second determiner 62 subtracts the rear wheel rotational speed Vr (output shaft rotational speed) obtained by the rear wheel axle sensor 52 from the input shaft rotational speed Vi detected by the input shaft sensor 51, and determines that the engagement protruding portion 36a of the gear 36 and the engagement recess portion 37a of the gear 37 are in the non-contact state, when the rotational speed difference V (V=Vi−Vr) between the input shaft rotational speed Vi and the rear wheel rotational speed Vr exceeds a predetermined speed threshold $V_1$. Alternatively, the rotational speed difference V may be integrated to derive relative positions of the engagement protruding portion 36a of the gear 36 and the engagement recess portion 37a of the gear 37, and it may be determined whether or not the engagement protruding portion 36a and the engagement recess portion 37a are in the non-contact state based on their relative position.

The acceleration and deceleration controller 63 primarily executes ignition control to increase/decrease the engine torque to thereby increase or decrease the rotational speed Vi of the input shaft 24 so that the rotational speed difference between the input shaft 24 and the output shaft 28 is decreased, when at least one of the first and second determiners 61 and 62 determines that driving power transmission members of the dog clutch 30 are in the non-contact state (acceleration or deceleration control). The reason why the ignition control is used in this case is that the ignition control provides higher responsiveness in the engine control than fuel injection amount control, and other controls.

When the rotational speed Vi of the input shaft 24 is decreased according to a result of the determination performed by the first determiner 61, ignition is skipped or ignition timing is retarded significantly in several cylinders, to reduce the engine torque significantly, to increase the degree to which the rotational speed Vi of the input shaft 24 is decreased. When the rotational speed Vi of the input shaft 24 is increased according to a result of the determination, the ignition timing is advanced (put ahead) to a predetermined value or timing (e.g., MBT). In contrast, when the second determiner 62 determines that the engagement protruding portion 36a and the engagement recess portion 37a are in the non-contact state, the engine torque is controlled by retarding or advancing the ignition timing to decrease or increase the rotational speed Vi of the input shaft 24. The degree to which the rotational speed Vi of the input shaft 24 is increased or decreased is made less when the second determiner 62 determines that the engagement protruding portion 36a and the engagement recess portion 37a are in the non-contact state than when the first determiner 61 determines that the engagement protruding portion 36a and the engagement recess portion 37a are in the non-contact state.

As described above, the degree to which the rotational speed Vi of the input shaft 24 is increased or decreased is made different between when the first determiner 61 makes a determination and when the second determiner 62 makes a determination. The reason is as follows. If the input shaft rotational speed Vi changes rapidly when the engagement protruding portion 36a of the gear 36 and the engagement recess portion 37a of the gear 37 are in the non-contact state, the first determiner 61 can determine promptly that they are in the non-contact state. However, there may be a chance that if the input shaft rotational speed Vi does not change so greatly even in the non-contact state, for example, when the motorcycle 1 is accelerated gradually, the first determiner 61 cannot correctly determine that they are in the non-contact state.

In contrast, the second determiner 62 makes a determination based on the rotational speed difference V (V=Vi−Vr) between the input shaft rotational speed Vi and the rear wheel rotational speed Vr. Therefore, the second determiner 62 might make a misdetermination, due to a deflection, extension and contraction of the chain 15, and other causes. The misdetermination would result in repeated acceleration or deceleration control, which makes driving feeling worse. If the absolute value of the threshold $V_1$ used for the determination is set to a relatively greater value to prevent the misdetermination, then initiating of the acceleration or deceleration control might be delayed and the impact may not be mitigated. If the acceleration or deceleration control is performed such that the degree to which the rotational speed Vi of the input shaft 24 is increased or decreased is increased, to prevent such a situation, the driver may probably feel uneasy.

As a solution to the above, in the present embodiment, the determination made by the first determiner 61 and the determination made by the second determiner 62 are combined. For example, when the second determiner 62 determines that the engagement protruding portion 36a and the engagement recess portion 37a are in the non-contact state, the degree to which the rotational speed Vi of the input shaft 24 is increased or decreased in the acceleration or deceleration control is reduced, and thus, the frequent control which would result from the misdetermination will not make driving feeling worse. In addition, when the first determiner 61 is capable of making a determination promptly that the engagement protruding portion 36a and the engagement recess portion 37a are in the non-contact state, the degree to which rotational speed Vi of the input shaft 24 is increased or decreased in the acceleration or deceleration control is increased, thereby preventing an impact from being generated even if the second determiner 62 makes a misdetermination.

Figure 6:
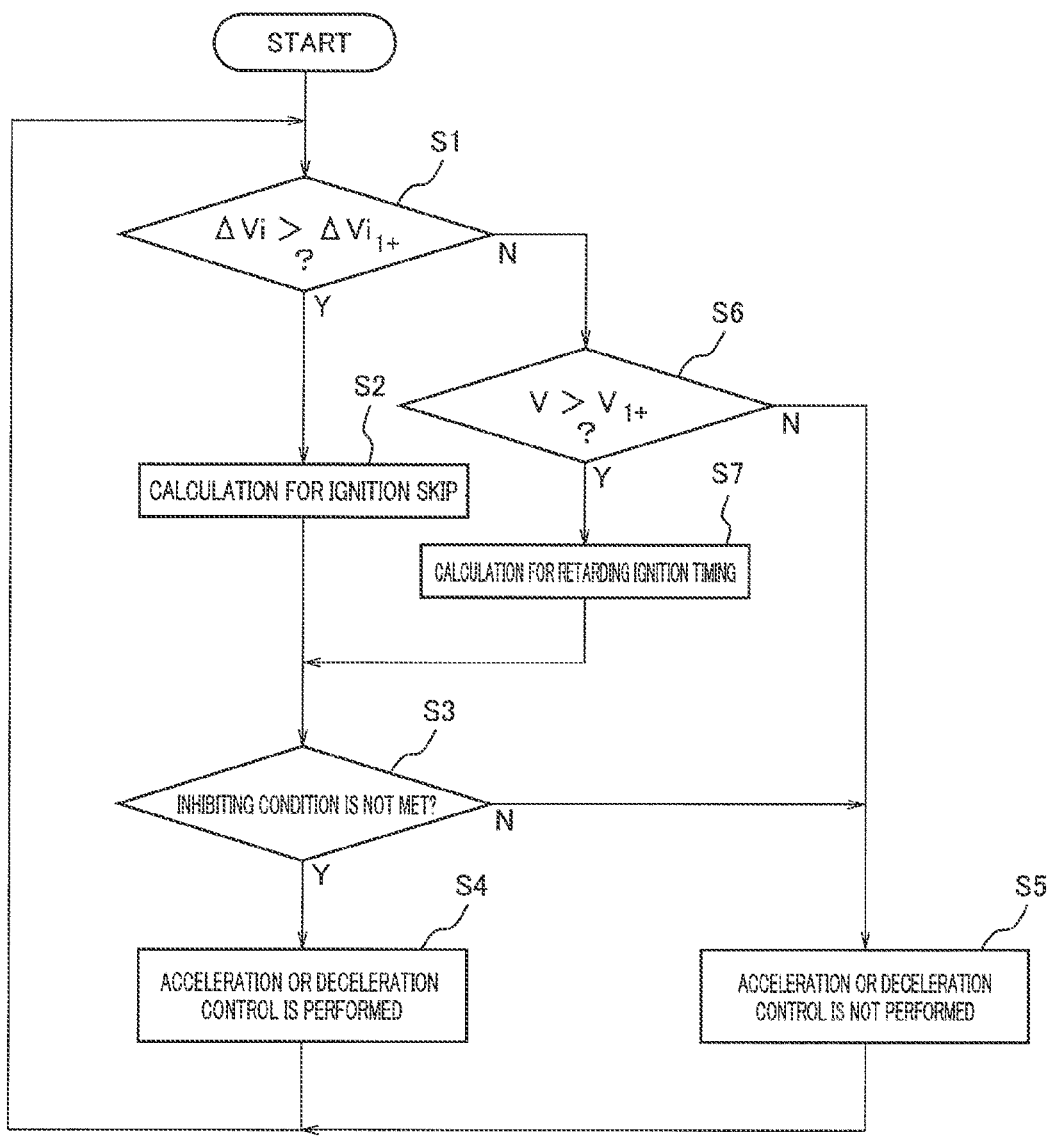
FIG. 6 is a flowchart showing a control process performed in the vehicle control system of FIG. 4 when the motorcycle shifts from decelerated driving to accelerated driving.

Control Procedure Performed when Motorcycle Shifts from Decelerated Driving to Accelerated Driving Hereinafter, the control procedure performed by the vehicle control system 40 when the motorcycle 1 shifts from the decelerated driving to the accelerated driving will be described with reference to FIGS. 6 and 7. FIG. 6 is a flowchart showing a control process performed in the vehicle control system 40 of FIG. 4 when the motorcycle 1 shifts from the decelerated driving to accelerated driving. FIGS. 7A and 7B are timing charts showing changes in the input shaft rotational speed Vi, the output shaft rotational speed Vo (in this example, rotational speed of the output shaft 28 of the transmission 14), and the rear wheel rotational speed Vr, which occur, under the control, when the motorcycle 1 shifts from the decelerated driving to the accelerated driving.

Referring to the flowchart of FIG. 6, during driving of the motorcycle 1, initially, it is determined whether or not the difference ΔVi of the input shaft rotational speed Vi is greater than a differential (difference) threshold $\Delta Vi_{1+}$ which is a positive value (step S1). The differential threshold $\Delta Vi_{1+}$ is set to a great value which does not occur when the rear wheel 3 slips on a normal road surface and the force applied from the road surface to the rear wheel 3 reduces rapidly. Using the differential threshold $\Delta Vi_{1+}$, it can be determined whether or not the driving power transmission members of the dog clutch 30 are in the non-contact state such that this is distinguishable from the slip state.

Figure 8A:
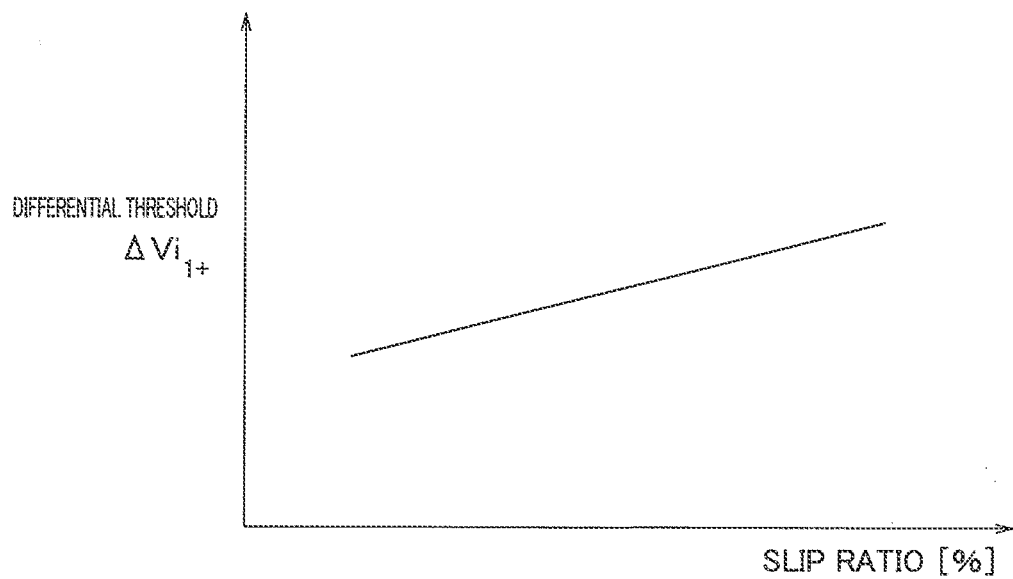
FIG. 8A is a view showing how a differential (difference) threshold changes by compensation according to a slip ratio.

However, the degree to which the rear wheel 3 slips increases and this state may be misdetermined as the non-contact state of the dog clutch 30, depending on a road surface condition. Therefore, the slip ratio of the rear wheel 3 is detected and the differential threshold $\Delta Vi_{1+}$ is compensated to increase as the value of the slip ratio increases. To be specific, the differential threshold $\Delta Vi_{1+}$ set preliminarily by an experiment or the like is compensated according to a predetermined formula or a table including the detected value of the slip ratio as a parameter. FIG. 8A depicts how the differential threshold $\Delta Vi_{1+}$ changes by the compensation.

The differential threshold $\Delta Vi_{1+}$ may be compensated based on a vehicle state amount (e.g., vehicle speed, engine speed, throttle valve opening degree, transmission gear position, operated state of a clutch, actuated state of a brake, etc.), other than the slip state of the rear wheel 3. In particular, in a case where the engine speed is relatively low, the driver tends to feel uneasy if ignition is skipped or the ignition timing is retarded significantly. In light of this, when the engine speed is lower, the differential threshold $\Delta Vi_{1+}$ is compensated to be greater so that the ignition skip control or the like is performed less frequently.

Figure 8B:
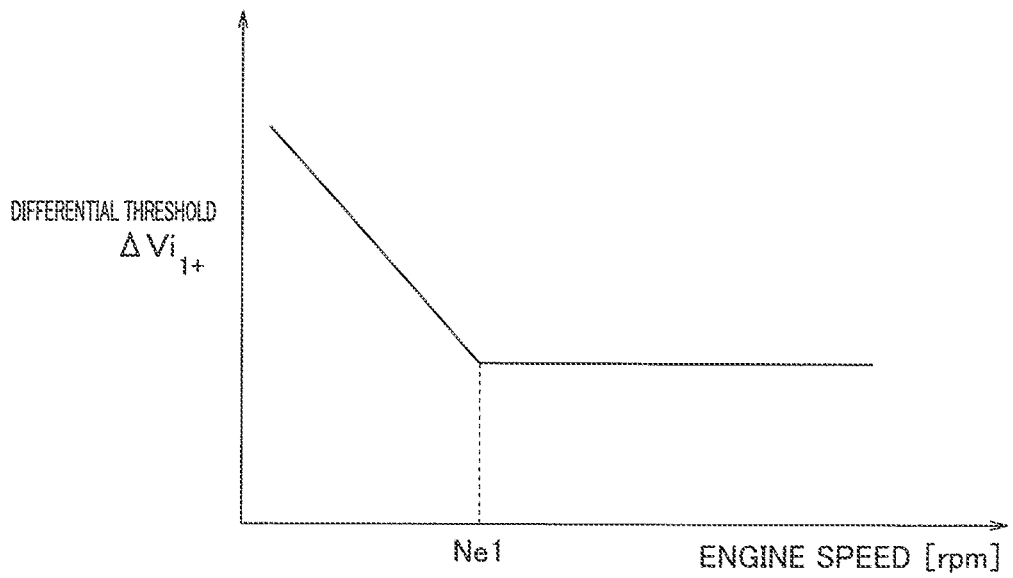
FIG. 8B is a view showing how the differential threshold changes by compensation according to an engine speed, corresponding to FIG. 8A.

As shown in FIG. 8B, when the engine speed is lower than a predetermined value Ne1, the differential threshold $\Delta Vi_{1+}$ may be greater as the engine speed is lower, while when the engine speed is higher than or equal to the predetermined value Ne1, the differential threshold $\Delta Vi_{1+}$ may be maintained at a substantially constant value. Instead of the engine speed shown in FIG. 8B, the differential threshold $\Delta Vi_{1+}$ may be compensated based on various vehicle state amounts corresponding to the magnitude of the engine speed, such as the throttle valve opening degree, the vehicle speed, the air-intake pressure of the engine E, etc.

Turning back to the flowchart of FIG. 6, if it is determined that the difference ΔVi of the input shaft rotational speed Vi is greater than the differential threshold $\Delta Vi_{1+}$ (Yes in step S1), the first determiner 61 determines that the engagement protruding portion 36a of the gear 36 and the engagement recess portion 37a of the gear 37 in the dog clutch 30 are in the non-contact state, and calculation for acceleration or deceleration control is performed (step S2). In this time, since the decelerated driving shifts to the accelerated driving, deceleration control for reducing the engine torque is performed. Since the first determiner 61 makes the determination, the ignition skip control is performed to increase the degree to which the rotational speed Vi of the input shaft 24 is decreased.

It should be noted that the acceleration or deceleration control should not be executed for other reasons. Therefore, subsequent to step S2, it is determined whether or not a condition used for inhibiting the execution of the acceleration or deceleration control is not met (step S3). The condition used for inhibiting the execution of the acceleration or deceleration control is, for example, such that the clutch 34 is disengaged or the brake 53 is actuated. If the answer is No in Step S3, unnecessary acceleration or deceleration control is not performed (step S5). This makes it easy to ensure acceleration capability when the clutch 34 is returned to the engaged state or the brake 53 is unactuated.

If it is determined that the condition is not met (Yes in step S3), the ignition slip control is performed in the acceleration or deceleration control (step S4). The ignition skip control performed in a case where the engine E is an inline four cylinder engine will be described. Ignition in at least one from among the four cylinders is paused according to a predetermined pattern as shown in table 1 as depicted below.

TABLE 1

|  | First | Second | Third | Fourth | Fifth |
|---|---|---|---|---|---|
| Pattern 1 | X | ○ | ○ | ○ | ○ |
| Pattern 2 | X | X | ○ | ○ | ○ |

In table 1, first, second, third, fourth and fifth represent the order of ignition in the cylinders after start of the ignition skip control, symbol ○ indicates execution of ignition in the corresponding cylinder, and symbol X indicates that ignition is paused in the corresponding cylinder. Table 1 depicts two patterns between which the degree to which the rotational speed Vi of the input shaft 24 is decreased in the deceleration control, i.e., the degree to which the engine torque is reduced, is different.

The ignition skip control based on the pattern 1 will be described in more detail. After start of the ignition skip control, ignition is paused in a cylinder which is scheduled to perform ignition first in order, but ignition occurs successively in cylinders scheduled to perform ignition second, third, fourth, and fifth in order. When ignition in the cylinder scheduled to perform ignition fifth in order is complete, the pattern 1 is repeated, so that ignition is paused in the cylinder scheduled to perform ignition sixth in order. According to the pattern 1, the cylinder in which ignition is paused is shifted one by one, and thus, ignition is not paused in the same cylinder continuously. The ignition skip control can reduce the engine torque more greatly than the ignition retard control and can decrease the input shaft rotational speed Vi more quickly than the ignition retard control.

Turning back to the flowchart of FIG. 6, if No is the answer in step S1, then the second determiner 62 determines whether or not the engagement protruding portion 36a and the engagement recess portion 37a are in the non-contact state. To be specific, the second determiner 62 determines whether or not a rotational speed difference V (V=Vi−Vr) between the input shaft rotational speed Vi and the rear wheel rotational speed Vr is greater than a speed threshold $Vi_{1+}$ which is a positive value (step S6). If Yes is the answer in step S6, the second determiner 62 determines that the engagement protruding portion 36a and the engagement recess portion 37a are in the non-contact state, and calculation for the deceleration control is performed as described above. In this case, since the second determiner 62 makes a determination, calculation for retarding the ignition timing is performed to suppress the degree to which the rotational speed Vi of the input shaft 24 is decreased (step S7).

It is determined whether or not the condition used for inhibiting the execution of the acceleration or deceleration control is not met in step S3. If it is determined that the condition is not met (Yes in step S3), the acceleration or deceleration control (in this case, deceleration control) is performed in step S4. In this control, ignition timings of all of the cylinders in the engine E may be retarded, or, otherwise, the ignition timings of one or more cylinders may be retarded according to a predetermined pattern, like the above ignition skip control. Since the degree to which the rotational speed Vi of the input shaft 24 is decreased by retarding the ignition timing is less than the degree to which the rotational speed Vi of the input shaft 24 is decreased by the ignition skip, it is possible to reduce a chance that the driver feels uneasy even if the second determiner 62 misdetermines the non-contact state of the dog clutch 30 and the deceleration control is executed.

The amount of the ignition timing to be retarded may be increased as the rotational speed difference V between the rotational speed Vi of the input shaft 24 and the rear wheel rotational speed Vr increases. To be specific, when the rotational speed difference between the gears 36 and 37 in the dog clutch 30 is great and a great impact is more likely to be generated by the re-contact between the engagement protruding portion 36a and the engagement recess portion 37a, the input shaft rotational speed Vi is decreased effectively by the deceleration control for reducing the rotational speed Vi to a greater degree, thereby reducing the relative rotational speed of the engagement protruding portion 36a and the engagement recess portion 37a.

If No is the answer in step S6, it may be determined that the engagement protruding portion 36a and the engagement recess portion 37a are not in the non-contact state and there is no fear of generation of an impact, and therefore, the acceleration or deceleration control is not executed (step S5). In the above described manner, it is determined whether or not the driving power transmission members in the dog clutch 30 are in the non-contact state, and the acceleration or deceleration control is executed only when it is predicted that a substantial impact is more likely to be generated by the re-contact of them. As a result, it is possible to avoid an opportunity that the driver's driving feeling gets worse by the execution of unnecessary acceleration or deceleration control.

Change in Rotational Speed Occurring when Motorcycle Shifts from Decelerated Driving to Accelerated Driving Subsequently, the above acceleration or deceleration control will be explained along a time-series procedure with reference to the timing charts of FIGS. 7A and 7B. The input shaft rotational speed Vi in FIGS. 7A and 7B is defined as a value derived by multiplying the detected value of the input shaft sensor 51 by a deceleration rate associated with the gears 36 and 37, and the like, and the rear wheel rotational speed Vr in FIGS. 7A and 7B is defined as a value derived by dividing the detected value of the rear wheel axle sensor 52 by a predetermined deceleration rate. In a state where the engagement protruding portion 36a and the engagement recess portion 37a are not displaced relatively to each other, the input shaft rotational speed Vi and the output shaft rotational speed Vo conform to each other. Also, assuming that there is no slack in the driving power transmission members in the driving system including the chain 15, the input shaft rotational speed Vi, the output shaft rotational speed Vo, and the rear wheel rotational speed Vr conform to each other.

In a case where the motorcycle 1 shifts from decelerated driving to accelerated driving relatively gradually, the driver does not rotate the throttle grip 7 to a great amount. As shown in FIG. 7A, for example, at time t0, the throttle grip 7 is rotated, and the engine torque increases a little after time t0 and thereby the input shaft rotational speed Vi changes from decreasing to increasing (time t1).

At this time, in the dog clutch 30, the gear 36 is displaced relatively to the gear 37 in such a way that the engagement protruding portion 36a of the gear 36 moves away from the deceleration wall surface 37c of the engagement recess portion 37a of the gear 37 toward the acceleration wall surface 37b of the engagement recess portion 37a, and thus they move to the non-contact state temporarily (for a certain period of time). In this state, as indicated by a dashed line in FIG. 7A, the output shaft rotational speed Vo does not change substantially, whereas as indicated by a solid line in FIG. 7A, only the input shaft rotational speed Vi increases. Since the input shaft rotational speed Vi does not increase so steeply, the determination performed by the first determiner 61 based on the difference ΔVi of the input shaft rotational speed Vi does not occur.

Figure 7A:
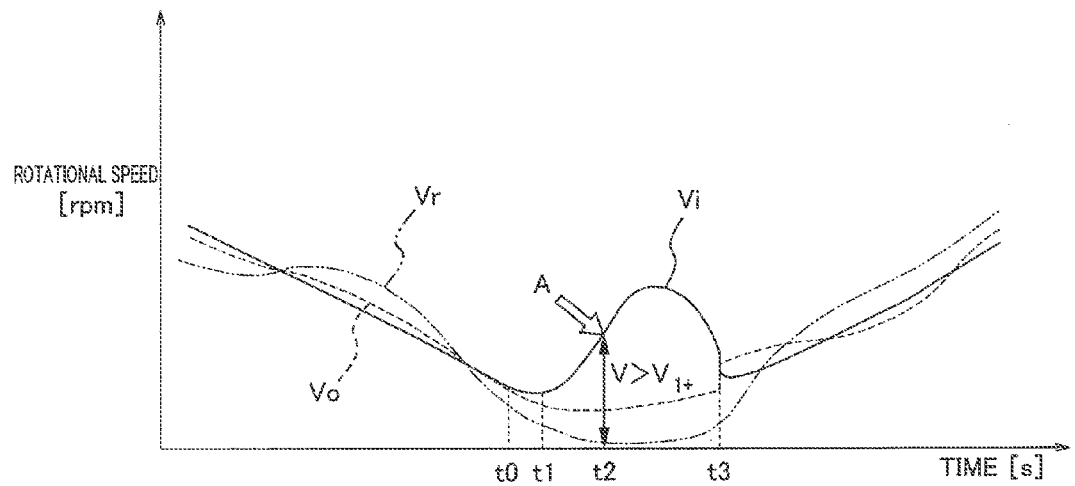
FIG. 7A is a timing chart of the control process shown in FIG. 6, showing a case where it is determined whether or not driving power transmission members in the driving system are in a non-contact state, based on a rotational speed difference between an input shaft and an output shaft.

As indicated by an imaginary line (two-dotted dashed line) in FIG. 7A, the rear wheel rotational speed Vr deviates from the input shaft rotational speed Vi or the output shaft rotational speed Vo. This occurs mainly due to a slack of the chain 15. The deviation becomes great temporarily when the motorcycle 1 shifts from the decelerated driving to the accelerated driving. In the example shown in FIG. 7A, during the shifting, the rear wheel rotational speed Vr deviates to be lower than the output shaft rotational speed Vo. In this case, apparently, the rotational speed difference V between the rear wheel rotational speed Vr and the input shaft rotational speed Vi is great.

At point A, the rotational speed difference V exceeds the speed threshold $V_{1+}$ and the second determiner 62 determines that the engagement protruding portion 36a and the engagement recess portion 37a are in the non-contact state (time t2). According to a result of the determination, as described above, the deceleration control is executed by retarding the ignition timings of the cylinders to suppress an increase in the input shaft rotational speed Vi, which changes from increasing to decreasing soon, as shown in FIG. 7A. Thereafter, when the engagement protruding portion 36a of the gear 36 re-contacts the acceleration wall surface 37b of the engagement recess portion 37a of the gear 37 (time t3), the input shaft rotational speed Vi decreases rapidly, while the output shaft rotational speed Vo increases rapidly, and the rear wheel rotational speed Vr increases a little time after the output shaft rotational speed Vo increases.

At time t3 when the engagement protruding portion 36a of the gear 36 and the engagement recess portion 37a of the gear 37 re-contact each other, the input shaft rotational speed Vi has been reduced already by the above deceleration control, and the rotational speed difference between the input shaft rotational speed Vi and the output shaft rotational speed Vo is not so great. As a result, an impact generated by the re-contact of the engagement protruding portion 36a and the engagement recess portion 37a is not so great, and the driver does not feel discomfort.

Subsequently, a case where the driver rapidly rotates the throttle grip 7 to a position corresponding to a fully open position of the throttle valve to shift the decelerated driving to the accelerated driving will be described. As shown in FIG. 7B, when the throttle grip 7 is rotated to a position corresponding to the fully open position of the throttle valve at time t0, the engine torque increases rapidly and thereby the input shaft rotational speed Vi increases rapidly (time t1~). In the dog clutch 30, the engagement protruding portion 36a of the gear 36 and the engagement recess portion 37a of the gear 37 move to the non-contact state. In this state, the input shaft rotational speed Vi (solid line) rises steeply away from the output shaft rotational speed Vo (broken line) which does not change so much.

Figure 7B:
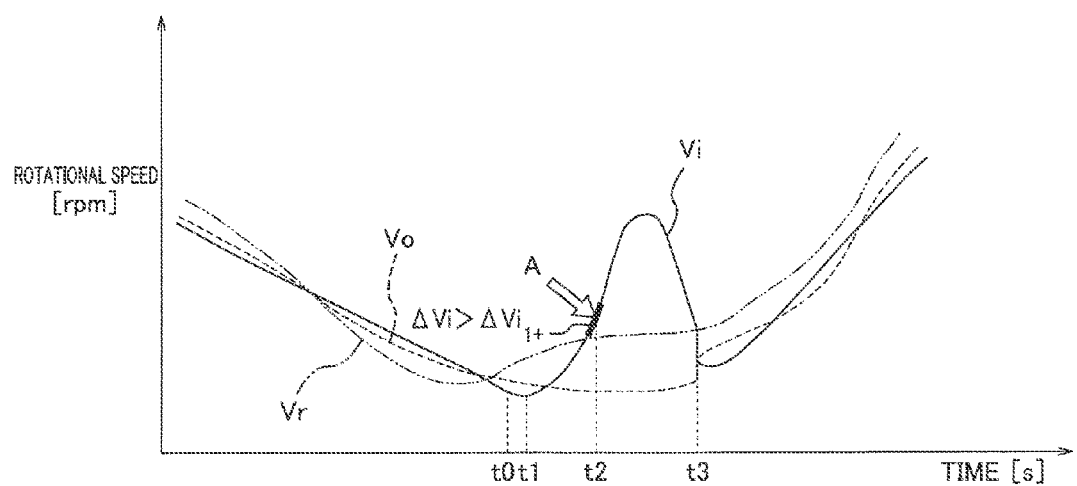
FIG. 7B is a view showing a case where it is determined whether or not the driving power transmission members in the driving system are in the non-contact state, based on a difference of an input shaft rotational speed, corresponding to FIG. 7A.

Unlike the example of FIG. 7A, in the example of FIG. 7B, the rear wheel rotational speed Vr deviates to be higher than the output shaft rotational speed Vo. In this case, even when the input shaft rotational speed Vi rises steeply as described above, the rotational speed difference V between the input shaft rotational speed Vi and the rear wheel rotational speed Vr is not great, and initiating of the determination performed by the second determiner 62 tends to be delayed. However, the difference $\Delta Vi_{1+}$ of the input shaft rotational speed Vi, rising steeply, exceeds the differential threshold $\Delta Vi_{1+}$ (point A), the first determiner 61 initiates the determination as to the non-contact state of the dog clutch 30 (time t2).

According to a result of the determination performed by the first determiner 61, the deceleration control is performed such that the degree to which the rotational speed Vi is decreased is increased, by the ignition skip control in which ignition in the cylinders is paused. As a result, the engine torque decreases rapidly, and thereby the input shaft rotational speed Vi, which has risen steeply, decreases quickly. Because of this, when the engagement recess portion 36a of the gear 36 re-contacts the acceleration wall surface 37b of the engagement recess portion 37a of the gear 37 at time t3, the rotational speed difference V between the rear wheel rotational speed Vr and the input shaft rotational speed Vi is not so great, so that an impact generated by the re-contact of the engagement protruding portion 36a and the engagement recess portion 37a (collision between them), is not so great.

As should be appreciated from the above description, in the case where the motorcycle 1 shifts from the decelerated driving to the accelerated driving, it is determined that the gears 36 and 37 of the dog clutch 30 in the transmission 14 are in the non-contact state, if the change rate (difference ΔVi) of the input shaft rotational speed Vi of the transmission 14 is great or the rotational speed difference V between input shaft rotational speed Vi and the rear wheel rotational speed Vr is great, and the ignition control is performed to reduce the input shaft rotational speed Vi to lessen the rotational speed difference between the input shaft 24 and the output shaft 28. This makes it possible to mitigate the impact generated by the re-contact of the gears 36 and 37 and improve driving feeling.

The determination as to the non-contact state of the dog clutch 30 is performed by the first and second determiners 61 and 62 using difference indices, and the degree to which the rotational speed Vi of the input shaft 24 is decreased is made different between the determination performed by the first determiner 61 and the determination performed by the second determiner 62. Thus, more proper control is achieved. In some occasions, there is a chance that the determination performed by the second determiner 62 based on the rotational speed difference V between input shaft rotational speed Vi and the rear wheel rotational speed Vr might be a misdetermination, due to a slack of the chain 15. Accordingly, when the second determiner 62 makes a determination, the degree to which the rotational speed Vi of the input shaft 24 is decreased is reduced. As a result, the driver's feeling would not get worse even if the deceleration control is performed frequently due to the misdetermination.

In contrast, in the case where the first determiner 61 determines that the engagement protruding portion 36a and the engagement recess portion 37a are in the non-contact state based on the difference ΔVi of the input shaft rotational speed Vi, the degree to which the rotational speed Vi of the input shaft 24 is decreased is increased, to reduce the input shaft rotational speed Vi immediately. This makes it possible to mitigate an impact effectively even if the second determiner 62 misdetermines the non-contact state. In addition, the determination threshold (differential threshold) $\Delta Vi_{1+}$ is compensated according to the vehicle state amount. This makes it possible to avoid misdetermination that the engagement protruding portion 36a of the gear 36 and the engagement recess portion 37a are in the non-contact state, for example, even though the rear wheel 3 is slipping greatly on the road surface, and lessen the number of times the determination is performed when the engine speed is in a low engine speed range in which there is a tendency that the driver feels uneasy.

Figure 9:
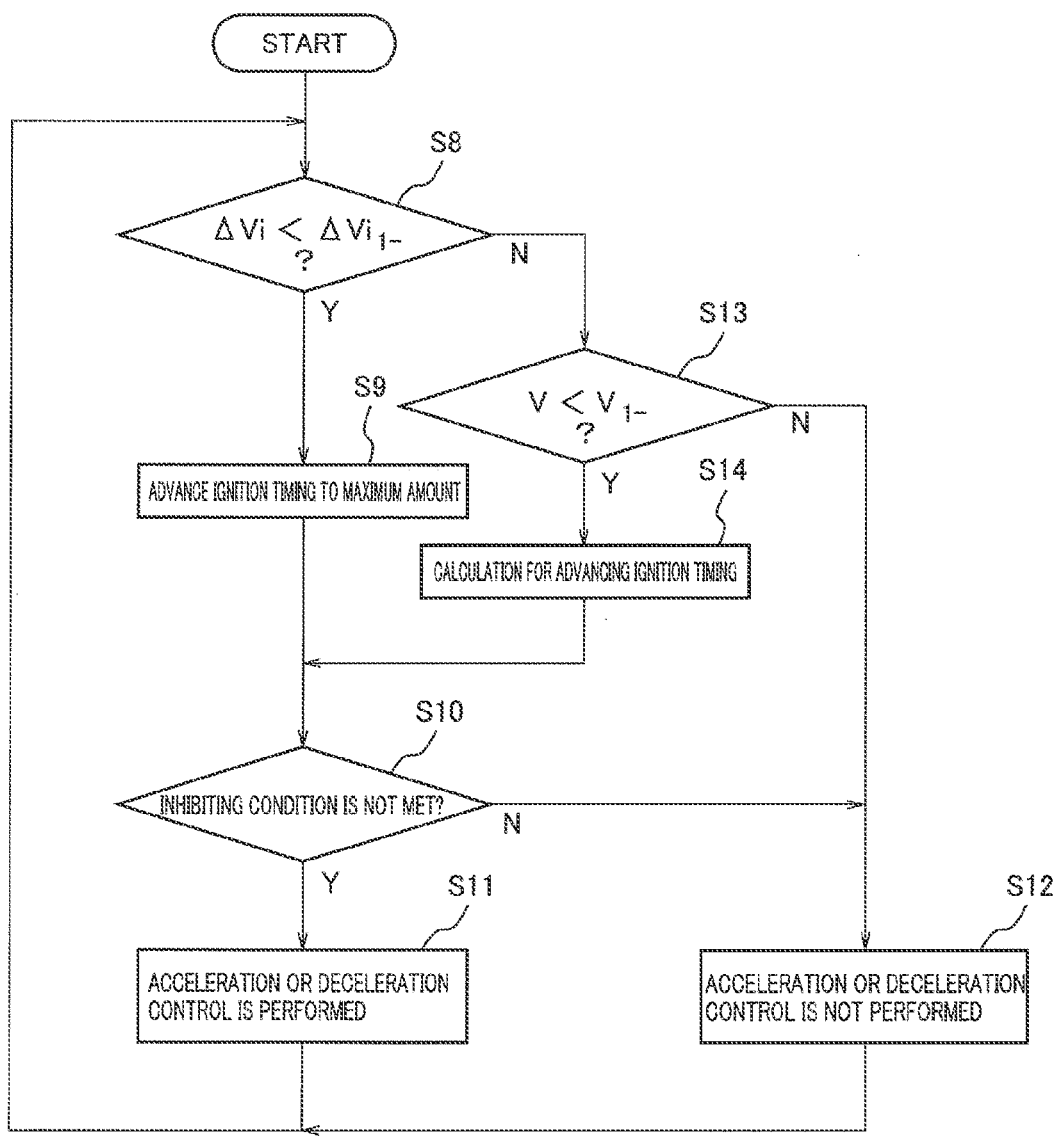
FIG. 9 is a flowchart showing a control process performed in the vehicle control system of FIG. 4 when the motorcycle shifts from the accelerated driving to the decelerated driving.

Control Performed when Motorcycle Shifts from Accelerated Driving to Decelerated Driving FIG. 9 is a flowchart showing a control process performed in the vehicle control system 40 of FIG. 4 when the motorcycle 1 shifts from accelerated driving to decelerated driving. Like the flowchart shown in FIG. 6, during driving of the motorcycle 1, initially, it is determined whether or not the difference ΔVi of the input shaft rotational speed Vi is less than a differential threshold $\Delta Vi_{1-}$ which is a negative value (step S8). If Yes ($\Delta Vi_1 < \Delta Vi_{1-}$) is the answer in step S8, it is determined that the engagement protruding portion 36a and the engagement recess portion 37a are in the non-contact state, and the calculation for the accelerated or decelerated control is performed (step S9). Since the accelerated driving shifts to the decelerated driving in the present case, the acceleration control is performed. Since the first determiner 61 makes the determination, the ignition timing is advanced to a predetermined value.

Then, it is determined whether or not the condition used for inhibiting the execution of the acceleration or deceleration control is not met (step S10). If the condition is not met (Yes in step S10), then the ignition timing is advanced to a predetermined value to increase the rotational speed Vi of the input shaft 24 (step S11: ACCELERATION OR DECELERATION CONTROL IS PERFORMED). On the other hand, if the condition is met (No in step S10), the acceleration or deceleration control is not executed (step S12).

On the other hand, if it is determined that the difference ΔVi of the input shaft rotational speed Vi is greater than or equal to the differential threshold $\Delta Vi_{1-}$ (No in step S8), then the second determiner 62 determines whether or not the rotational speed difference V (V=Vi−Vr) between the input shaft rotational speed Vi and the rear wheel rotational speed Vr is less than a speed threshold $V_{1-}$ which is a negative value (step S13). If Yes is the answer in step S13, the second determiner 62 determines that the engagement protruding portion 36a and the engagement recess portion 37a are in the non-contact state, and calculation for the acceleration control is performed. In this case, since the second determiner 62 makes the determination, the calculation for the acceleration control is performed so that the amount of advancement of the ignition timing is reduced or the number of times the ignition timing is advanced is lessened (step S14).

If it is determined that the condition is not met (YES in step S10), the acceleration or deceleration control (in this case acceleration control) is executed by advancing the ignition timing so that the degree to which the rotational speed is decreased is reduced, whereas if it is determined that the condition is met (No in step S10), the acceleration or deceleration is not executed (step S12). Like the retard amount of the ignition timing, the advancement amount of the ignition timing may be changed according to the rotational speed difference V between the input shaft rotational speed Vi and the rear wheel rotational speed Vr.

In the manner as described above, when the motorcycle 1 shifts from the accelerated driving to the decelerated driving, the first and second determiners 61 and 62 make a determination as to the non-contact state of the dog clutch 30 based on the change rate of the input shaft rotational speed Vi or the rotational speed difference V between the input shaft rotational speed Vi and the rear wheel rotational speed Vr. Thus, the acceleration or deceleration control is executed properly so that the degree to which the rotational speed Vi of the input shaft 24 is increased is made different. This makes it possible to increase the rotational speed Vi of the input shaft 24 properly to reduce the rotational speed difference between the rotational speed Vi of the input shaft 24 and the rotational speed of the output shaft 28. As a result, an impact generated by the re-contact of the gears 36 and 37 can be mitigated and driving feeling is improved.

In accordance with the vehicle control system 40 of Embodiment 1, if it is determined that the engagement protruding portion 36a of the gear 36 and the engagement recess portion 37a of the gear 37 of the dog clutch 30 in the transmission 14 which are engaged with each other with a slack are in the non-contact state, the engine torque is controlled to reduce a rotational speed difference between the component at an upstream side of the engaged portions and the component located at a downstream side of the engaged portions on the driving power transmission path. This makes it possible to mitigate an impact generated by the re-contact of the engagement protruding portion 36a of the gear 36 and the engagement recess portion 37a of the gear 37 and hence improve driving feeling.

The first determiner 61 is configured to determine whether or not the engagement protruding portion 36a and the engagement recess portion 37a are in the non-contact state based on the change rate (difference ΔVi) of the input shaft rotational speed Vi. Unlike the conventional control system and method, it is not necessary to detect the output shaft rotational speed Vo. This eliminates a need for a sensor attached on the output shaft 28 in the transmission 14, and hence avoids a need to prevent an adverse effect which would be caused by clattering of the chain 15 in order to protect this sensor. Thus, a cost increase is suppressed effectively.

In contrast, the second determiner 62 is configured to determine whether or not the engagement protruding portion 36a and the engagement recess portion 37a are in the noncontact state based on the rotational speed difference V between the input shaft rotational speed Vi and the rear wheel rotational speed Vr. By combining the determination performed by the first determiner 61 and the determination performed by the second determiner 62, which use different indices, precision in determination improves. Although the rear wheel axle sensor 52 is attached on the axle 32 of the rear wheel 3, it is not necessary to prevent an adverse effect which would be caused by clattering of the chain 15. Thus, a cost increase is suppressed effectively. In addition, the rear wheel axle sensor 52 may be used together with, for example, an antilock braking system.

Modified Example

Figure 10:
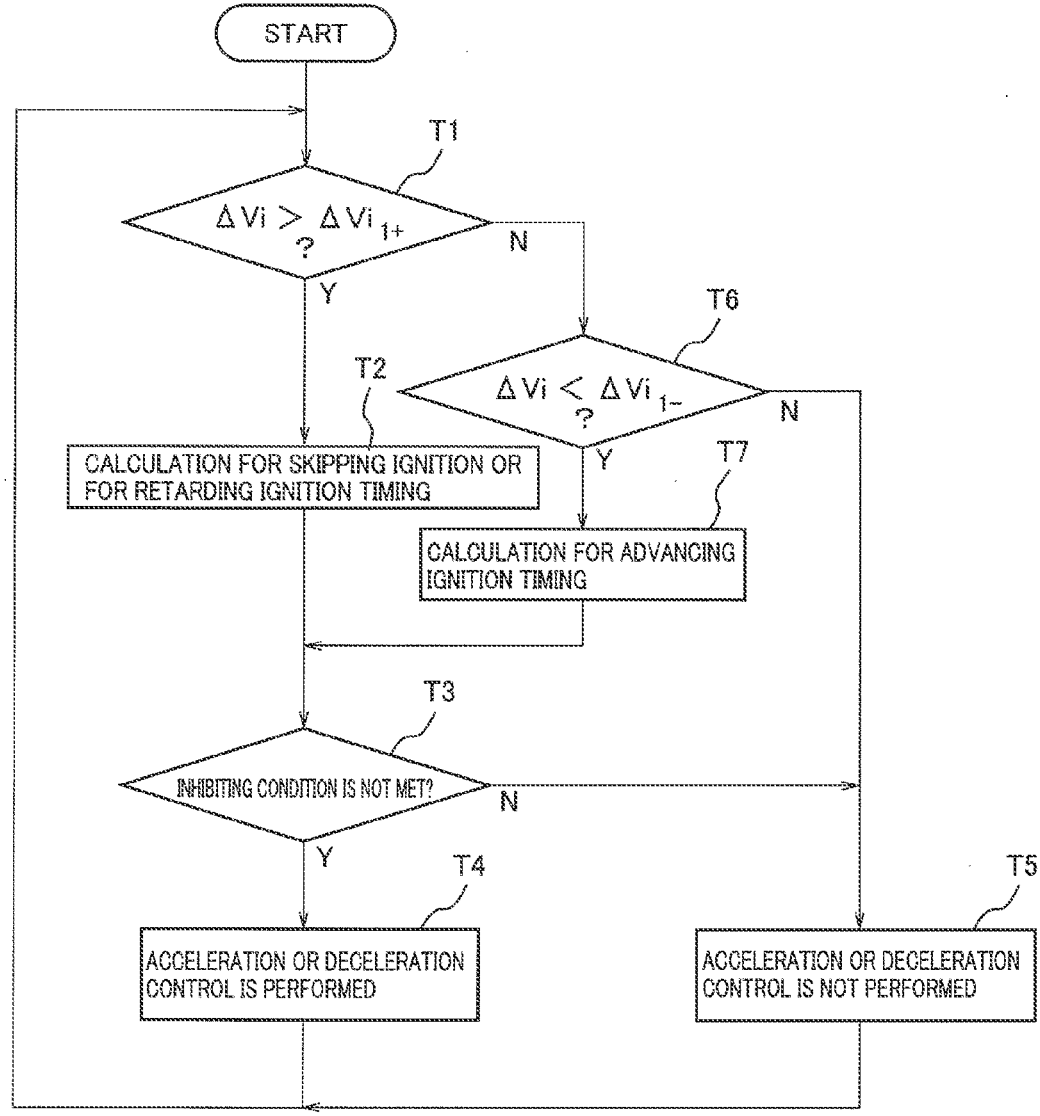
FIG. 10 is a view showing a case where it is determined whether or not the driving power transmission members in the driving system are in the non-contact state, only based on the difference in the input shaft rotational speed, corresponding to FIG. 6.

In modified example of Embodiment 1, both of the two determiners 61 and 62 need not be used, but instead, only the first determiner 61 for performing determination as to the non-contact state based on only the change rate of the input shaft rotational speed Vi may be used. In this case, for example, as shown in the flowchart of FIG. 10, it is determined whether or not the difference ΔVi of the input shaft rotational speed Vi is greater than a differential threshold $\Delta Vi_{1+}$ which is a positive value (step T1). If Yes ($\Delta Vi > \Delta Vi_{1+}$) in step T1, calculation for ignition skip or ignition retard is performed to reduce the rotational speed Vi of the input shaft 24 (step T2). Then, it is determined whether or not a condition used for inhibiting the execution of the acceleration or deceleration control is not met (step T3). If the condition is not met in step T3, then the acceleration or deceleration control (in this case deceleration control) is performed (step T4).

If the answer is No in step T1, i.e., it is determined that the difference ΔVi of the input shaft rotational speed Vi is less than or equal to the differential threshold $\Delta Vi_{1+}$, then it is determined whether or not the difference $\Delta Vi$ of the input shaft rotational speed Vi is less than the differential threshold $\Delta Vi_{1-}$ which is a negative value (step T6). If the answer is Yes ($\Delta Vi < \Delta Vi_{1-}$) in step T6, calculation for advancing the ignition timing is performed to increase the rotational speed Vi of the input shaft 24 (step T7). Then, it is determined whether or not a condition used for inhibiting the execution of the acceleration or deceleration control is not met (step T3). If Yes in step T3, then the acceleration or deceleration control (in this case deceleration control) is performed (step T4).

If the answer is No in step T1 and in step T6, i.e., it is determined that the difference $\Delta Vi$ of the input shaft rotational speed Vi is less than or equal to the differential threshold $\Delta Vi_{1+}$ which is a positive value and the difference $\Delta Vi$ of the input shaft rotational speed Vi is greater than or equal to the differential threshold $\Delta Vi_{-}$ which is a negative value, it is determined that the engagement protruding portion 36a and the engagement recess portion 37a are not in the non-contact state, and therefore the acceleration or deceleration control is not performed (step T5). If the answer is No in step T3, the acceleration or deceleration control is not performed (step T5).

(Embodiment 2)

Figure 11:
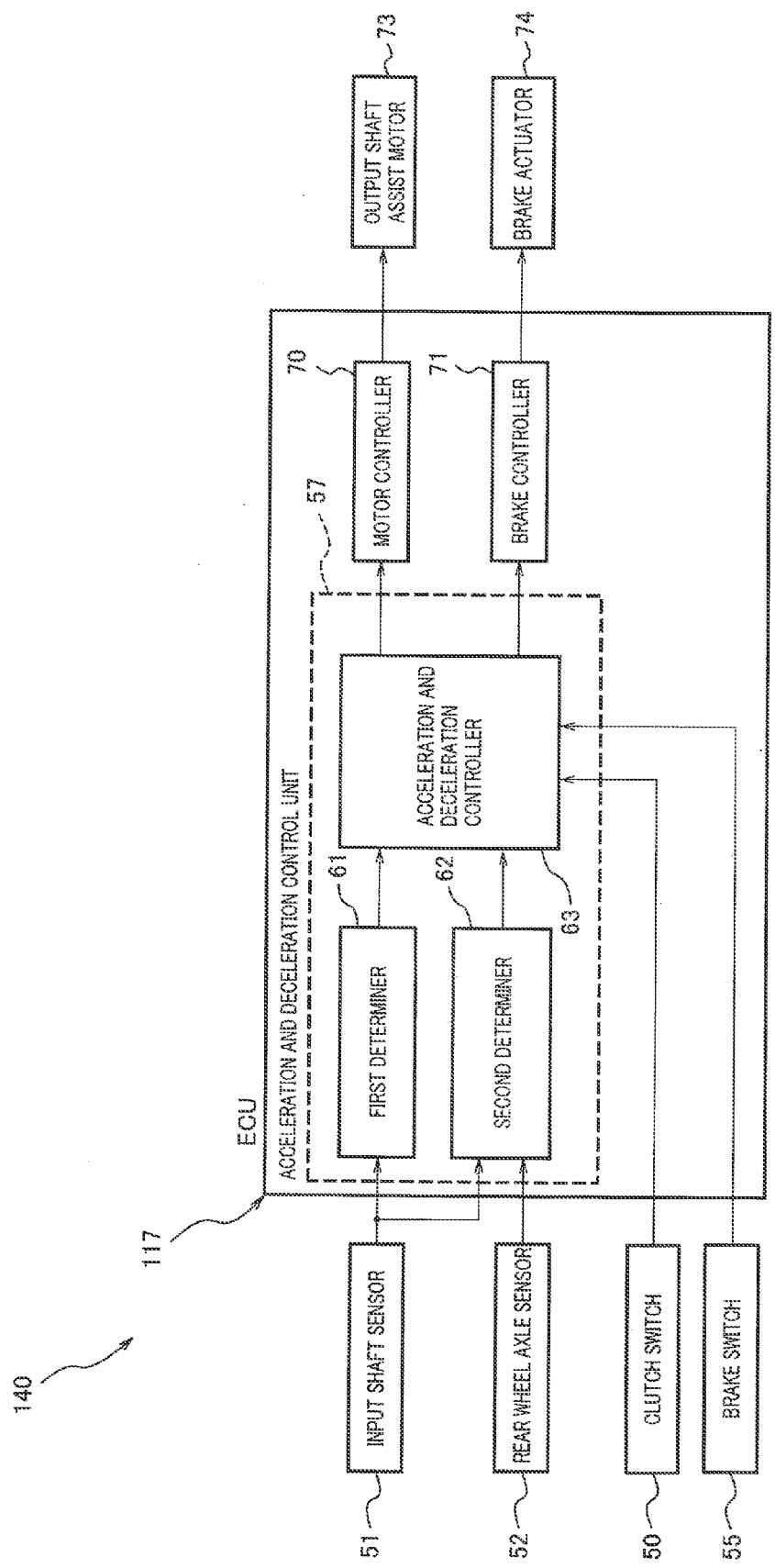
FIG. 11 is a block diagram showing major components in a vehicle control system according to Embodiment 2, corresponding to FIG. 4.

FIG. 11 is a block diagram showing major components in a vehicle control system 140 according to Embodiment 2 of the present invention. The same components as those in Embodiment 1 are identified by the same reference symbols and will not be described repetitively. Referring to FIG. 11, the vehicle control system 140 of Embodiment 2 includes an output shaft assist motor 73 for driving the output shaft 28 (see FIG. 2) and a brake actuator 74 for actuating a brake of the rear wheel 3 (see FIG. 1). An ECU 117 in the vehicle control system 140 includes a motor controller 70 for controlling the output shaft assist motor 73 and a brake controller 71 for controlling the brake actuator 74. An acceleration and deceleration controller 63 in the ECU 117 performs acceleration or deceleration in such a manner that it actuates the output shaft assist motor 73 or the brake actuator 74 to accelerate or decelerate the output shaft 28.

In accordance with this configuration, in the flowchart of FIG. 6, the output shaft assist motor 73 is driven to increase the rotational speed the output shaft 28, instead of the ignition skip control or the ignition retard control, thereby reducing the rotational speed difference between the input shaft 24 and the output shaft 28 when the motorcycle 1 shifts from the decelerated state to the accelerated state. Furthermore, in the flowchart of FIG. 9, the brake actuator 74 is driven to decrease the rotational speed of the output shaft 28, instead of the control for advancing the ignition timing, thereby reducing a rotational speed difference between the input shaft 24 and the output shaft 28 when the motorcycle 1 shifts from the accelerated state to the decelerated state.

Therefore, in the case where the motorcycle 1 shifts from the decelerated driving to the accelerated driving and the case where the motorcycle 1 shifts from the accelerated driving to the decelerated driving, even when the engagement protruding portion 36a of the gear 36 and the engagement recess portion 37a of the gear 37 of the dog clutch 30 in the transmission 14 which are engaged with each other with a slack are in the non-contact state, an impact generated by the re-contact of them is not so great, and thus driving feeling is improved.

Other Embodiment

The above embodiments and modified examples are merely exemplary and alternations may be suitably made as described below. Although the motorcycle 1 has been described as the vehicle in the above embodiments and modified examples, the present invention is applicable to any other vehicles so long as a vehicle includes at least one pair of driving power transmission members which are engaged with each other with a slack on the driving power transmission path through which a driving power is transmitted from a driving power source to a drive wheel.

Although in the above embodiments the vehicle including the engine E as the driving power source has been described, the present invention is applicable to an electric automobile including a motor instead of the engine or a hybrid vehicle including both of the motor and the engine. In that case, the motor with high responsiveness is preferably used in the control for increasing or decreasing the rotational speed Vi of the input shaft 24.

Although in the above embodiments, the motorcycle 1 configured to drive the rear wheel 3 via the chain 15 is described, a vehicle adapted to drive the rear wheel 3 via a belt or a drive shaft instead of the chain 15 may be used.

Although in Embodiment 1, the ignition skip control is performed when the first determiner 61 determines that the engagement protruding portion 36a and the engagement recess portion 37a are in the non-contact state, while the ignition retard control is performed when the second determiner 62 determines that the engagement protruding portion 36a and the engagement recess portion 37a are in the non-contact state, the ignition skip control may be performed when both of the first and second determiners 61 and 62 determine that the engagement protruding portion 36a and the engagement recess portion 37a are in the non-contact state in such a manner that the ignition skip control is performed more frequently when the first determiner 61 makes determination than when the second determiner 62 makes determination. Or, the ignition timing may be retarded when both of the first and second determiners 61 and 62 determine that the engagement protruding portion 36a and the engagement recess portion 37a are in the non-contact state in such a manner that the ignition retard amount is set greater when the first determiner 61 makes determination than when the second determiner 62 makes determination.

Furthermore, instead of or in addition to the ignition skip control or the ignition retard control, the engine torque may be reduced by reducing a fuel injection amount of the injector 47 or setting it to zero, or by reducing an air-intake amount by reducing the opening degree of the sub-throttle valve 43.

In addition to the case where the motorcycle 1 shifts from the decelerated driving to the accelerated driving and the case where the motorcycle 1 shifts from the accelerated driving to the decelerated driving as described in the above embodiments and modified examples, the control of the present invention is used effectively for a case where the driving power transmission members in the dog clutch 30 move to a non-contact state due to a fluctuation in the engine torque, a rear wheel slip, etc.

Instead of the change rate (difference $\Delta Vi$) of the input shaft rotational speed Vi, or the rotational speed difference V between the input shaft rotational speed Vi and the rear wheel rotational speed Vr, it may be determined whether or not the driving power transmission members in the dog clutch 30 are in the non-contact state, based on, for example, a change rate of the rear wheel rotational speed Vr.

Although in the above embodiments and modified example, the input shaft 24 of the transmission 14 is described as an input shaft located upstream of the dog clutch 30 on the driving power transmission path, the crankshaft 22 may be used as the input shaft located upstream of the dog clutch 30 on the driving power transmission path. In that case, a crank angle sensor may be used, as the input shaft sensor.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A control system in a vehicle including at least one pair of driving power transmission members which are engaged with each other with a slack on a driving power transmission path through which a driving power is transmitted from a driving power source to a drive wheel, the control system comprising:
an input shaft rotational speed detector for detecting a rotational speed of an input shaft located upstream of engaged portions of the driving power transmission members in a direction in which the driving power is transmitted, the engaged portions being engaged with each other with the slack;
a determiner for determining whether or not the driving power transmission members are in a non-contact state at the engaged portions for a period of time, based on a change rate of the detected input shaft rotational speed, the change rate being with respect to time; and
a controller for controlling the vehicle to reduce a rotational speed difference between the input shaft and an output shaft located downstream of the engaged portions in the direction in which the driving power is transmitted, when the determiner determines that the driving power transmission members are in the non-contact state.

2. The control system in the vehicle according to claim 1, wherein a threshold used to determine whether or not the driving power transmission members are in the non-contact state is changed according to a predetermined vehicle state.

3. The control system in the vehicle according to claim 1, wherein the driving power source is a multi-cylinder engine including a plurality of cylinders;
the controller causes ignition in at least one of the cylinders to be paused when the determiner determines that the driving power transmission members are in the non-contact state;
the determiner determines that the driving power transmission members are in the non-contact state, when an absolute value of the change rate of the input shaft rotational speed is greater than a predetermined threshold, the change rate being with respect to time; and
the threshold is changed such that an absolute value of the threshold is greater when an engine speed is relatively lower than when the engine speed is relatively higher.

4. The control system in the vehicle according to claim 1, wherein the output shaft is an output shaft of a transmission, the control system further comprising:
a downstream shaft rotational speed detector for detecting a rotational speed of a downstream shaft located downstream of the output shaft in the direction in which the driving power is transmitted;
wherein the determiner includes a first determiner for determining whether or not the driving power transmission members are in the non-contact state, based on the change rate of the input shaft rotational speed, the change rate being with respect to time; and
a second determiner for determining whether or not the driving power transmission members are in the non-contact state, based on a rotational speed difference between the input shaft rotational speed and the detected rotational speed of the downstream shaft; and
wherein the controller controls the vehicle based on a result of the determination performed by the first and the second determiners.

5. The control system in the vehicle according to claim 4, wherein the downstream shaft is an axle of the drive wheel, and the downstream shaft rotational speed detector is configured to detect a rotational speed of the axle of the drive wheel.

6. The control system in the vehicle according to claim 4, wherein the controller controls the vehicle such that the rotational speed difference between the input shaft and the output shaft is made less when the first determiner determines that the driving power transmission members are in the non-contact state, than when the second determiner determines that the driving power transmission members are in the non-contact state.

7. The control system in the vehicle according to claim 6, wherein the driving power source is a multi-cylinder engine including a plurality of cylinders;
the controller causes ignition in at least one of the cylinders to be paused when the first determiner determines that the driving power transmission members are in the non-contact state; and
the controller causes an ignition timing in at least one of the cylinders to be retarded when the second determiner determines that the driving power transmission members are in the non-contact state.

* * * * *